United States Patent
Suh et al.

(10) Patent No.: US 6,754,278 B1
(45) Date of Patent: Jun. 22, 2004

(54) METHOD FOR RECOVERING MOVING PICTURE BY EXTENDING A DAMAGED REGION IN WHICH AN ERROR OCCURS

(75) Inventors: Jae Won Suh, Kwangju-Kwangyok-shi (KR); Yo Sung Ho, Kwangju-Kwangyok-shi (KR); Eung Tae Kim, Seoul (KR); Seung Jong Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 09/616,888

(22) Filed: Jul. 14, 2000

(30) Foreign Application Priority Data

Jul. 15, 1999 (KR) .......................................... 1999-28723
Jul. 22, 1999 (KR) .......................................... 1999-29808

(51) Int. Cl.$^7$ ................................................ H04N 7/12
(52) U.S. Cl. .................................................. 375/240.27
(58) Field of Search ...................... 375/240.27, 240.26; H04N 7/12

(56) References Cited

U.S. PATENT DOCUMENTS 5,737,022 A * 4/1998 Yamaguchi et al. ... 375/240.27

* cited by examiner

Primary Examiner—Young Lee
(74) Attorney, Agent, or Firm—Birch, Stewart, Kolasch & Birch, LLP

(57) ABSTRACT

A method for recovering a moving picture in which an error occurs provides a more efficient and accurate recovery by enlarging a range of a damaged slice to include regions of undamaged slices adjacent to the damaged slice. Particularly, damaged macro blocks within the damaged slice may be upwardly and downwardly extended. Motion vectors for the extended portions are obtained and used to establish a search region within a previous frame. A closest match for the extended macro block is located within the search region and a portion thereof is replicated to replace the damaged macro block.

5 Claims, 5 Drawing Sheets extended macro block

METHOD FOR RECOVERING MOVING PICTURE BY EXTENDING A DAMAGED REGION IN WHICH AN ERROR OCCURS

BACKGROUND OF THE INVENTION

1. Field of the Invention

The present invention relates to MPEG-2 compression/recovery system, and more particularly, to a method for recovering a moving picture in MPEG-2 decompression system.

2. Background of the Related Art

Due to the development of recent digital signal processing techniques, methods for compression and transmission of moving picture information through a transmission channel of a limited bandwidth have been developed. MPEG-2 is a generally used digital video compression method which uses variable length coding such as the Huffinan coding and run-length coding, each having coded video bitstream. However, the digital compression is so sensitive to an error that, not only deterioration of a picture quality, but also propagation of the error in terms of time and space, occurs.

Particularly, when there is an error in a coded video bitstream, there are a variety of effects due to the error depending on the method of coding used. When an error occurs in MPEG bitstream, all information is damaged until a slice header, namely the next synchronization signal, is detected. The use of motion compensation coding causes continuous damage over many frames even after the damaged portion. Even if an error occurs in the transmission channel rather than the coded video bitstream itself, a picture quality of the recovered picture is poor.

To prevent errors occurring on the channel, a method for making an unequal compensation of errors by a hierarchal classification of a bitstream in the channel coding has been developed. This method reduces deterioration of the picture quality relatively simply by inserting a compensation algorithm both at an end of a transmission terminal and at a beginning of a reception terminal. However, this method cannot avoid picture quality deterioration and error propagation for errors outside of the error correction capability. Consequently, parallel processing, such as a forced insertion of an internal block in the coding and replacement with a prior picture in a decoding, is required. In order to recover the picture closely to an original picture, error concealing methods for complementing lost information with neighboring information properly recovered, rather than by an additional error correction code using the limited bandwidth, have been developing.

In the error concealing methods used in digital TVs, there are a spatial prediction error concealing method in which spatial duplication in the same frame containing lost information is utilized, and a temporal prediction error concealing method which uses the temporal redundancy between successive frames. The spatial prediction error concealing method compensates for a damaged macro block by using, not the temporal duplication, but information on macro blocks which are not damaged at the present frame. In this instance, different error concealing methods are suggested, in which the damaged macro block is replaced with a corresponding block close to the damaged block, or various interpolations are used.

However, in a case of such methods, it is difficult to expect of visibility the recovered picture because the information used for recovering the damaged macro block is limited to blocks above and below the damaged block. Also, if the damaged macro block has a size adequately smaller than the picture, an excellent picture quality compensation can be assured, but a large damaged macro block results in a poor recovered picture and much calculation for compensation is required at the receiver.

The temporal prediction concealing method recovers the damaged macro block by predicting a motion vector as an average of motion vectors of adjacent macro blocks in a temporal region, and using the predicted motion vector. That is, as successive pictures are correlated in terms of time, information on the damaged macro block in the present frame is recovered by using information in the previous frame and using the temporal correlation. As most general methods, there are a method in which information on the damaged block is replaced with information on macro blocks in the previous frame at identical positions, and a method in which a motion vector of the damage macro block is predicted from an average of motion vectors of macro blocks above and below the damaged macro block.

Although the temporal prediction concealing method is less complicated and fast, the method has a low reliability. That is, a simple replacement may cause substantial deterioration of the picture quality in a case when there is much motion between two successive frames because motions of the damaged macro blocks in the present frame are not taken into account. Also, the averaging method may cause a problem in a case when the adjacent macro block have no motion vector.

SUMMARY OF THE INVENTION

Accordingly, an object of the present invention is to solve at least the problems and disadvantages of the related art.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for recovering a moving picture, in which an error is concealed if an error occurs in a slice of a frame having a plurality of slices where each slice has a plurality of macro blocks, includes (1) extending a range of a damaged slice to include regions of undamaged slices adjacent to the damaged slice, and (2) obtaining a motion vector with the extended regions in a previous frame, to detect a region most similar to the extended regions, and transferring a macro block having the most similar region to the damaged macro block.

In another embodiment of the present invention, a method for recovering a moving picture includes (1) extending damaged macro blocks in upper and lower directions to include regions of undamaged macro blocks, (2) obtaining motion vectors for the damaged macro blocks with a previous frame by using the extended regions and averaging the motion vectors to set up an initial motion vector prediction value for the damaged macro blocks, and (3) setting up a search region of the macro block in previous frame centered on the initial motion vector prediction value, detecting a region most similar to the extended region from the search region, and transferring a macro block having the most similar region to the damaged macro block.

Here, the extended region may be extended in pixel units.

In still another embodiment of the present invention, a method for recovering a moving picture includes (1) extending each macro block in the damaged slice in upper and lower directions to include regions of undamaged macro blocks, (2) dividing the extended regions into a plurality of sub-blocks and obtaining a motion vector for each of the sub-blocks, (3) respectively obtaining a difference between blocks transferred from a previous frame by using the motion vector and setting up a weighted value to each of the sub-blocks according to the difference, (4) multiplying the weighted values to respective sub-blocks, summing the multiplied values, and determining the sum as a motion vector of the damaged block, and (5) searching a previous macro block for the most similar region to the extended region by using the determined motion vector, and transferring a macro block having the most similar region to the damaged macro block.

Here, each of the plurality of sub-blocks is defined between adjacent macro blocks on top and bottom to be shared by the two adjacent macro blocks. Also, the weighted value is large if the difference is small, and the weighted value is small if the difference is great.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
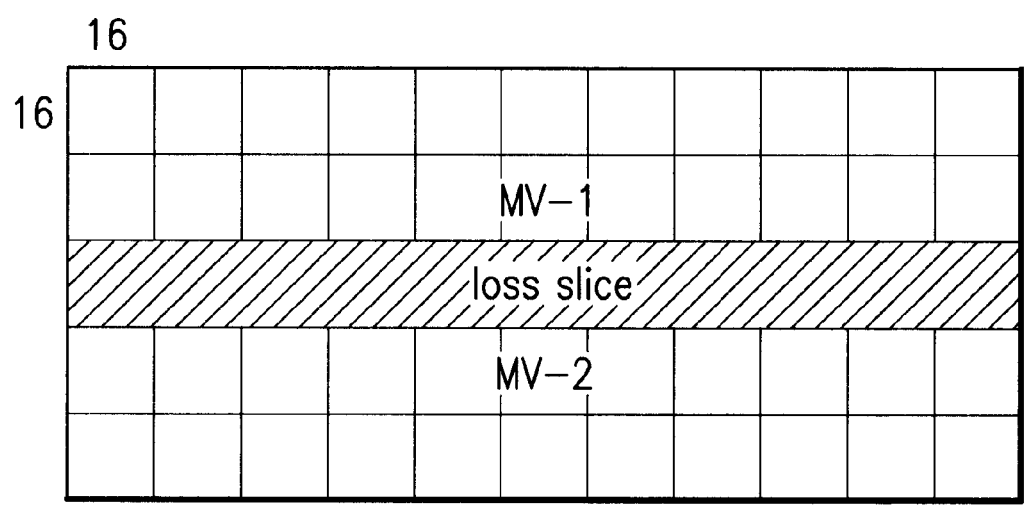
FIG. 1 illustrates an error propagation in a frame.

Reference will now be made in detail to the preferred embodiments of the present invention, examples of which are illustrated in the accompanying drawings. FIG. 1 illustrates an error propagation in a frame.

Referring to FIG. 1, in most moving picture standards, a frame is divided into 16*16 blocks each called a macro block, and the blocks are grouped into slice units. Therefore, if an error occurs in the slice unit, lots of macro blocks are damaged in succession until the next synchronizing signal is found.

Figure 2:
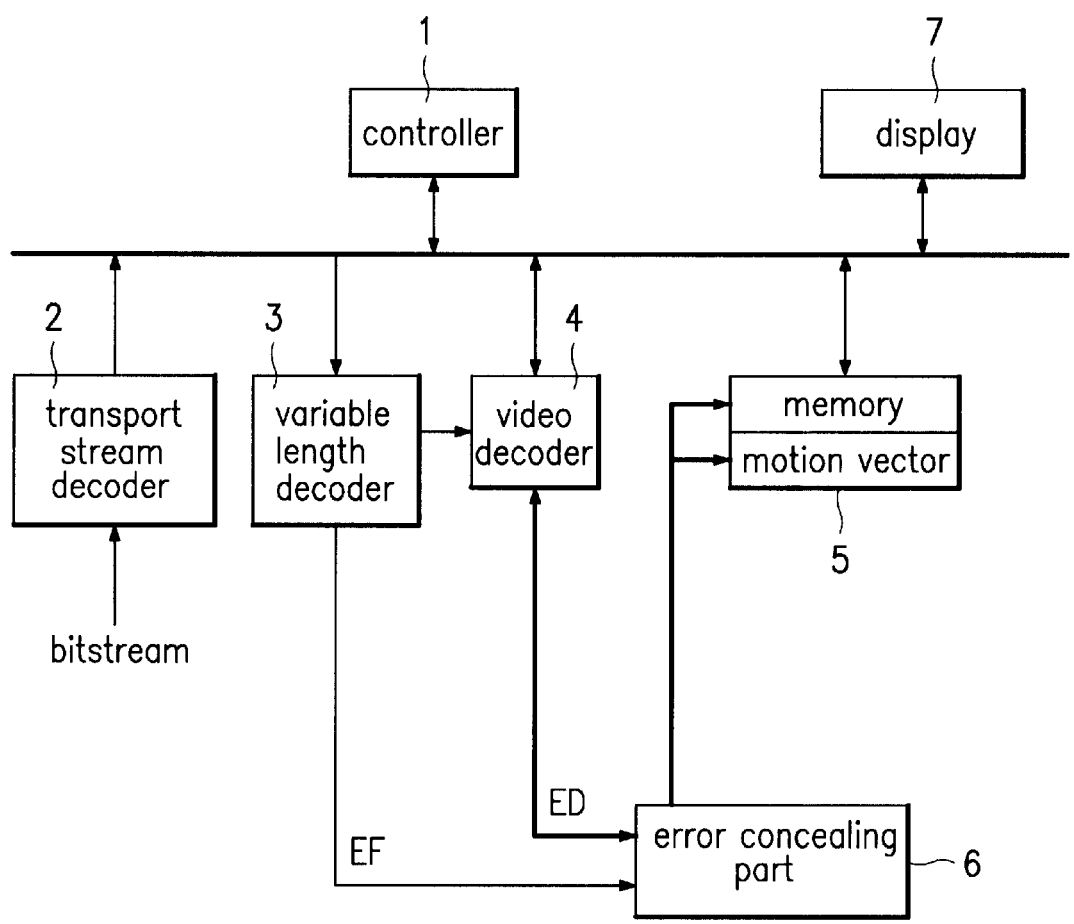
FIG. 2 illustrates one example of an MPEG-2 decompression system according to the present invention.

FIG. 2 is one example of an MPEG-2 decompression system according to the present invention including a controller 1 for general control of entire circuit; a transport stream decoder 2 for decoding a bitstream in response to a control signal from the controller 1; a variable length decoder 3 for subjecting the decoded transport stream to variable length decoding and attaching an error flag thereto if an error occurred; a video decoder 4 for decoding the signal decoded at the variable length decoder 3 into a video signal, storing in a memory 5, and presenting through a display 7; and an error concealing part 6 for concealing the error according to the error flag from the variable length decoder 3 in compensation for the error.

A method for recovering a moving picture in the foregoing MPEG-2 decompression system of the present invention will be explained with reference to the attached drawings.

Referring to FIG. 2, in order to recover an error in the damaged block, the bitstream from a receiver is passed through a channel decoder such as a Reed-Solomon which is a forward error correction code, in response to a control signal from the controller 1, and the transport stream decoder 2 sets a transport_error_indicator signal to indicate that an error occurred if an error occurred. Then, the video decoder 4 attaches a sequence_error_start_code to the bitstream according to a signal from the transport stream decoder 2, before forwarding the bitstream. According to this, the variable length decoder 3 subjects a signal from the transport stream decoder 2 to variable length decoding according to the sequence_error_start_code from the video decoder 4, and forwards a variable length decoded signal if no error is occurred or attaches an error flag EF to the variable length decoded signal before forwarding the signal if an error occurred.

That is, the variable length decoder 3 produces an error flag EF if a syntax error or semantic error occurs in the video stream and attaches the error flag EF to the signal from the transport stream decoder 2. The video decoder 4 decodes video streams without errors at the variable length decoder 3 and stores the decoded video stream in the memory 5, while forwarding the address of video streams having an error as an error data ED. According to this, the error concealing part 6 extracts motion information and pixel information from normally decoded blocks adjacent to the damaged block in a present frame according to the error flag EF from the variable length decoder 3 and the error data ED from the video decoder 4, to recover the moving picture. The recovered video stream is decoded at the video decoder 4 and displayed on the display 7.

The method for recovering the moving picture will be explained by way of embodiments with reference to the attached drawings.

First Embodiment

Figure 3A:
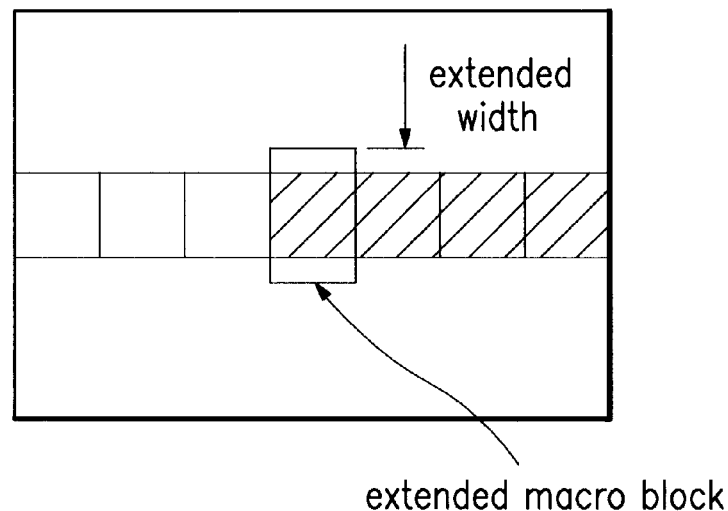
FIGS. 3A and 3B illustrate a method for recovering a moving picture by using an extended region of a damaged macro block in accordance with the present invention.
Figure 3B:
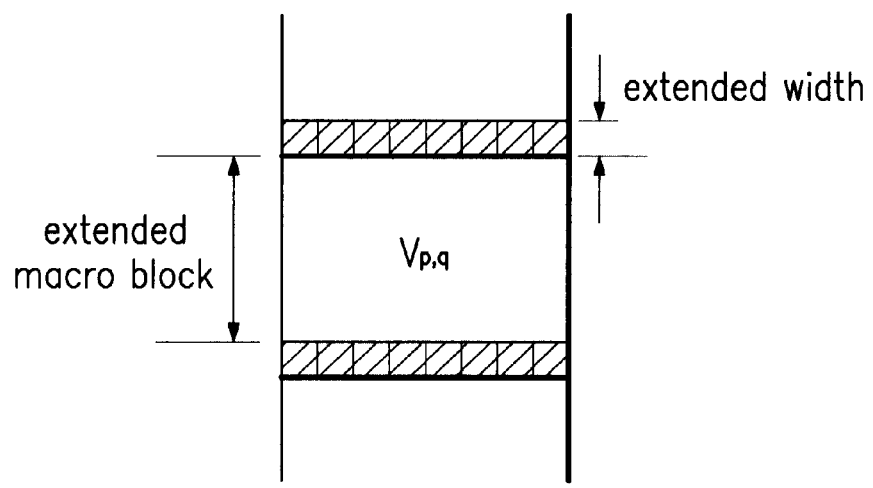

FIGS. 3A and 3B illustrate a method for recovering a moving picture by using an extended region of a damaged macro block in accordance with the present invention. If there is a slice damaged by an error in a frame, damaged macro blocks in the damaged slice are extended to contain regions of normal macro blocks adjacently positioned above and below the damaged blocks. The extended macro block is shown in FIGS. 3A and 3B.

The width of the extension is defined in pixel units and in the preferred embodiment, the width is defined as 8*16, a half of 16*16 macro block. However, the width may be defined to other values such as a larger value for better picture quality, but more calculation is required as the width increases. Accordingly, a smaller width provides a poor picture quality, but less calculation would be required, thereby providing a faster recovery. Therefore, the width should be adjusted in consideration of picture quality and speed of the recovered picture.

Figure 4A:
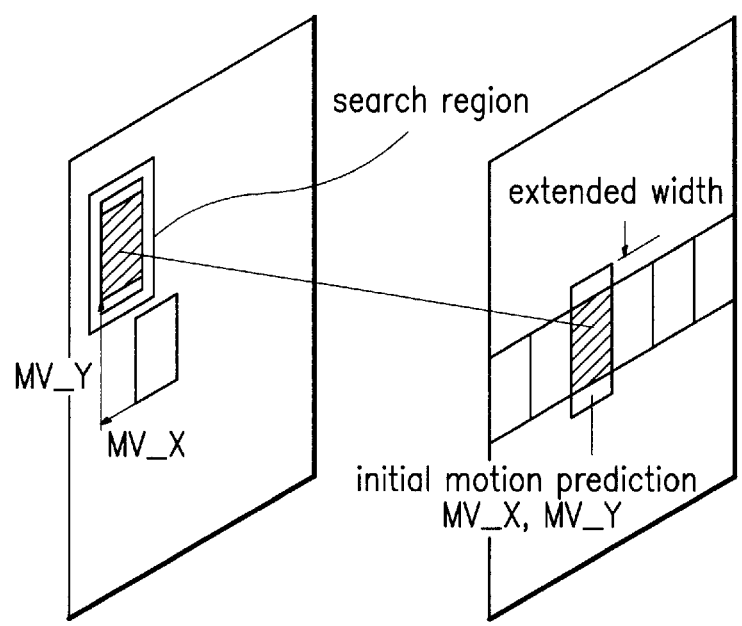
FIGS. 4A and 4B illustrate a process for predicting a motion in an extended region by using an initial value according to a method for recovering a moving picture in accordance with the present invention.
Figure 4B:
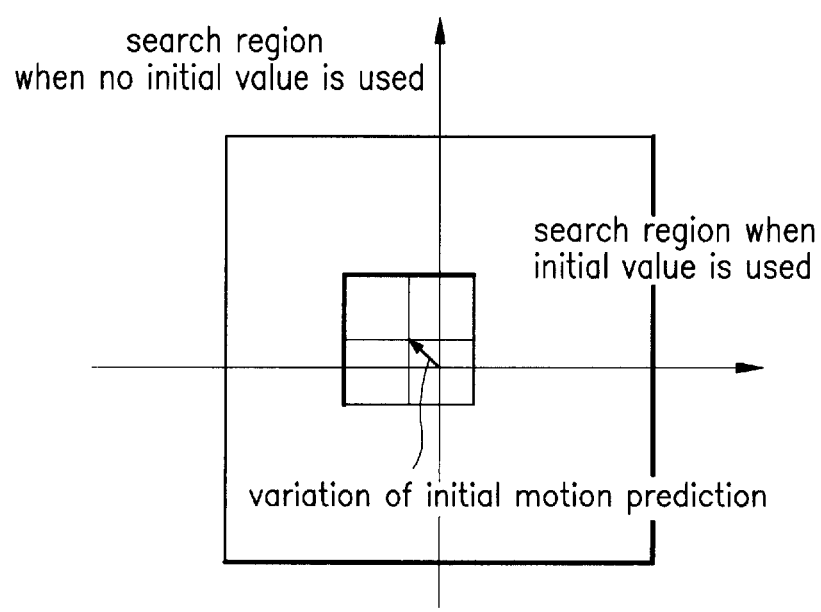

The $V_{p,q}$ in FIG. 3B illustrates a motion vector of the damaged macro block. Motion vectors for blocks above and below the damaged macro block are averaged to set up a predicted value of an initial motion vector MV_X, MV_Y. Then, as shown in FIG. 4A, a macro block of a previous frame is set as a search region based upon the initial motion vector MV_X, MV_Y, and a region in the search region most similar to the extended macro block is detected for recovering the damaged macro block. Also, as shown in FIG. 4B, a search region using the initial value is smaller than a search region without an initial motion vector. This allows for a faster computation. The foregoing process is repeated until moving pictures for all damaged macro blocks in the damaged slice are recovered.

Alternatively, after the motion vectors are obtained from the extended regions above and below the damaged macro block, relevant macro blocks in a previous frame may be set as search regions using the obtained motion vectors. Thereafter, the most similar region is detected from the set search regions for recovering the damaged macro block.

Second Embodiment

Figure 5:
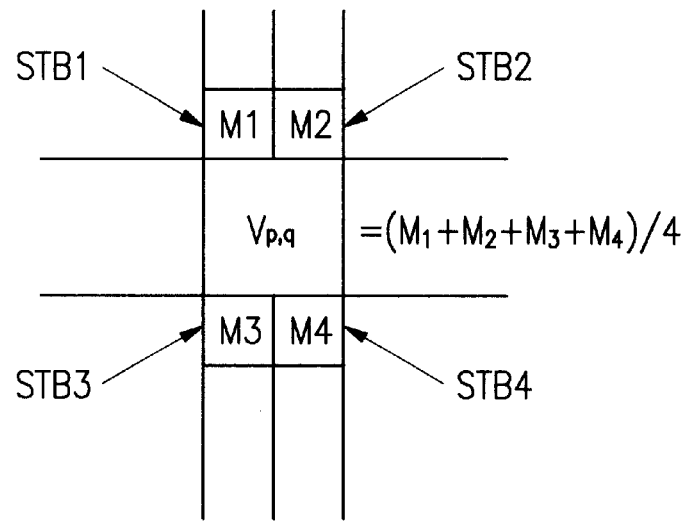
FIG. 5 illustrates one embodiment of a method for predicting a motion vector according to a method for concealing an error in an MPEG-2 decompression system in accordance with the present invention; and, FIG. 6 illustrates another embodiment of a method for predicting a motion vector according to a method for concealing an error in accordance with the present invention.

The block unit recovery in the first embodiment of the present invention may result in a deterioration of a picture quality of the recovered picture when there is much motion within one frame block. Therefore, a second embodiment of the present invention suggests a division of the extended block region in the first embodiment into a plurality of sub-block units and a comparison of the sub-block units with the previous frame block, for recovering the present frame block using an average. FIG. 5 is an embodiment of a method for predicting a motion vector according to a method for concealing an error in an MPEG-2 decompression system in accordance with the present invention.

Referring to FIG. 5, assume the upper sub blocks STB1 and STB2 has motion vectors M1 and M2 respectively, and lower sub blocks STB3 and STB4 has motion vectors M3 and M4 respectively. The motion vectors M1~M4 for the sub-blocks STB1~STB4 are first obtained and an average of the motion vectors M1, M2, M3, and M4 is calculated as the motion vector Vp,q of the damaged macro block. That is, by using the motion vectors of the sub-blocks in the present frame, the damaged block is replaced by the corresponding block in the previous frame.

By copying a block from the previous frame which corresponds to the average of the calculated motion vector to the damaged block in the present frame, a damaged frame may be recovered, such that the moving picture has a better visibility even in when a moving picture has much motion. The foregoing process is repeated until the moving picture for all the damaged blocks in a slice unit is recovered.

Also, a size of a sub-block is determined as the user likes. Here, one block has 8*8 size, which is a quarter of 16*16 macro block. However, the size may be defined to other values such as a larger value for better picture quality, but more calculation is required as the size increases. Accordingly, a smaller size provides a poor picture quality, but less calculation would be required, thereby providing a faster recovery. Therefore, the size should be adjusted in consideration of picture quality and speed of the recovered picture.

Third Embodiment

Since one block in the second embodiment has four sub-blocks, one slice with 11 blocks has 44 sub-blocks. Therefore, for recovering one slice, motion vectors for the 44 sub-blocks are calculated, requiring a substantial time period. A method for solving this problem will be explained with reference to FIG. 6 which illustrates another embodiment of a method for predicting a motion vector according to a method for concealing an error in accordance with the present invention.

Figure 6:
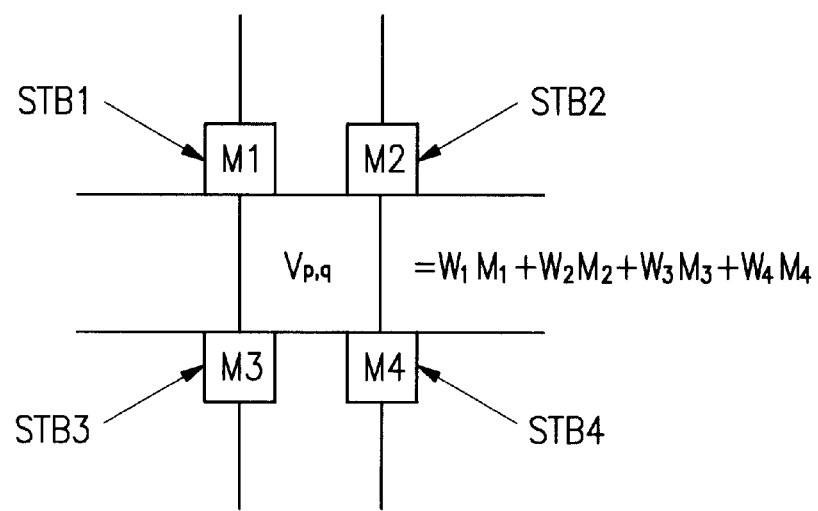

Referring to FIG. 6, one sub-block is defined on top and bottom of two adjacent blocks within one slice. That is, each of the 8*8 sub-blocks STB1~STB4 is shared by two adjacent macro blocks within the damaged slice. The motion vectors M1~M4 of the respective sub-blocks are then calculated. Since the two motion vectors (M1, M3), (M2, M4) calculated for a present macro block can be used for prediction of a motion vector for the next adjacent macro block, the computational load required for the calculation is reduced by half In the preferred embodiment, sub-blocks from a previous frame are extracted based upon a predicted block of the previous frame and the calculated motion vectors M1~M4. Particularly, the abidate pixel differences between a sub-blocks in the present frame and a motion compensated sub-blocks in a previous frame are calculated. Assuming that the motion prediction is highly accurate if the difference of the subblock is small, a greater weight (W) is given, and a smaller weighted value W is given if the difference is large.

The weighted value 'w' can be expressed as an equation (1), below.

$$W_n = 1 - \frac{E(M_n)}{\sum_{n=1}^{4} E(M_n)} \quad (1),$$

where, E(Mn) denotes a difference between a sub-block adjacent to the damaged block in the present frame and a motion compensated sub-block in the previous frame, which can be expressed as follows.

$$E(M_n) = \sum_i \sum_j \{B_n^t(i,j) - B_n^{t-1}(i + V_{xn}, j + V_{yn})\} \quad (2),$$

where, $M_n = (V_{xn}, V_{yn})$, $B_n^t(i,j)$ denotes a pixel in a sub-block in the present frame, and $B_n^{t-1}(i,j)$ denotes a pixel in a sub-block in the previous frame.

Subsequently, the motion vectors are multiplied with respective weighted values W and summed to determine a motion vector Vp,q of the damaged macro block. Thus, the previous frame is searched for the most similar macro block, for recovery of the damaged block. The foregoing process is repeated until the moving picture for all the damaged blocks in a slice unit is recovered.

The weighted values W are given to respective sub-blocks, as there are much picture movements even in one block, for taking the most similar block from the previous frame blocks, for improving visibility of the picture. Therefore, determination of a motion vector of the damaged block by giving weighted values W according to a difference between a sub-block in the present frame and a motion compensated sub-block in a previous frame permits more accurate recovery of the damaged block, that improves a system performance. Nevertheless, by defining a plurality of sub-blocks, each shared by blocks of the damaged slice, and by predicting motion vectors of respective sub-blocks, the calculation time required in the recovery of the damaged block can be reduced by half.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for recovering a moving picture in which an error occurs comprising:

determining whether or not an error has occurred within one or more macro blocks, which reside side-by-side to one another within a damaged slice of video within a given frame;

if so, forming an extended macro block by extending an upper region of a damaged first macro block within the damaged slice to include a portion of an undamaged second macro block above the damaged first macro block, and extending a lower region of the damaged first macro block to include a portion of an undamaged third macro block below the damaged first macro block, wherein the portion of the undamaged second macro block is divided into first and second sub blocks, and the portion of the undamaged third macro block is divided into third and fourth sub blocks;

obtaining first, second, third and fourth motion vectors using the first, second, third and fourth sub blocks, respectively;

averaging the first, second, third and fourth motion vectors to obtain a predicted motion vector for the damaged first macro block;

establishing a search region in a previous frame based upon the predicted motion vector for the damaged first macro block, wherein the search region is larger than the extended macro block;

finding a first region within the search region having a same size of the extended macro block and which is most similar to the extended macro block;

extracting a replacement macro block from the first region; and replacing the damaged first macro block with the replacement macro block.

2. The method of claim 1, wherein a macro block is measured in size by pixel units.

3. The method of claim 2, wherein a macro block is sixteen pixels in height by sixteen pixels in width.

4. The method of claim 2, wherein the damaged first macro block is sixteen pixels in height by sixteen pixels in width, and the first, second, third and fourth sub blocks are eight pixels in height by eight pixels in width, respectively.

5. The method of claim 1, wherein the first sub block overlies a boundary between the damaged first macro block and a fourth macro block to the left of the damaged first macro block in the slice, the second sub block overlies a boundary between the damaged first macro block and a fifth macro block to the right of the damaged first macro block in the slice, the fourth sub block underlies the boundary between the damaged first macro block and the third macro block, and the fourth sub block underlies the boundary between the damaged first macro block and the fifth macro block.

* * * * *